United States Patent [19]

Hackworth et al.

[11] Patent Number: 5,679,437
[45] Date of Patent: Oct. 21, 1997

[54] REFLECTIVE MARKING TAPE WITH MESH LAYER

[75] Inventors: Keith L. Hackworth, Dittmer; Jerry E. Moore, DeSoto, both of Mo.

[73] Assignee: Flex-O-Lite, Inc., St. Louis, Mo.

[21] Appl. No.: 509,658

[22] Filed: Jul. 31, 1995

[51] Int. Cl.[6] .................................... B32B 5/16; E01F 9/00
[52] U.S. Cl. .......................... 428/143; 428/141; 428/149; 428/325; 428/215; 428/523; 404/14; 359/538; 442/2; 442/38; 442/41; 442/43; 442/46; 442/49
[58] Field of Search ....................... 428/143, 141, 428/144, 325, 246, 247, 252, 255, 215, 523; 404/14; 359/538; 442/2, 38, 41, 43, 46, 49

[56] References Cited

U.S. PATENT DOCUMENTS

| | | | |
|---|---|---|---|
| 2,407,680 | 3/1946 | Palmquist et al. | 88/82 |
| 3,915,771 | 10/1975 | Gatzke et al. | 156/71 |
| 3,935,365 | 1/1976 | Eigenmann | 428/323 |
| 4,020,211 | 4/1977 | Eigenmann | 428/323 |
| 4,117,192 | 9/1978 | Jorgensen | 428/337 |
| 4,146,635 | 3/1979 | Eigenmann | 428/283 |
| 4,248,932 | 2/1981 | Tung et al. | 428/325 |
| 4,299,874 | 11/1981 | Jones et al. | 428/143 |
| 4,415,615 | 11/1983 | Esmay et al. | 428/40 |
| 5,194,113 | 3/1993 | Lasch et al. | 156/243 |
| 5,198,301 | 3/1993 | Hager et al. | 428/355 |
| 5,286,682 | 2/1994 | Jacobs et al. | 501/34 |
| 5,310,278 | 5/1994 | Kaczmarczik et al. | 404/14 |

FOREIGN PATENT DOCUMENTS 559261  2/1944  United Kingdom.

*Primary Examiner*—William Watkins
*Attorney, Agent, or Firm*—Edward H. Renner

[57] ABSTRACT

A peelable roadway marking tape has a multi-layer structure which provides durability and ease of removal. The marking tape includes a top layer of pigmented vinyl paint with reflective glass beads incorporated therein applied to an intermediate backing layer of either aluminum or vinyl. The backing layer is then laminated to a polyester mesh reinforcement layer, and a pressure-sensitive adhesive hot melt is applied to the under side surface of the mesh for attachment to the roadway surface. In an alternate embodiment of the invention, a layer of high density polyethylene is laminated between the mesh layer and an aluminum backing layer.

14 Claims, 2 Drawing Sheets

REFLECTIVE MARKING TAPE WITH MESH LAYER

BACKGROUND OF THE INVENTION

1. Field of the Invention

The present invention relates to reflective marking tapes used on paved roadways for guiding the flow of traffic, and more particularly to reflective marking tapes with multi-layer structures which are removable without leaving adhesive residue on the road, are highly visible, and remain intact in variable weather conditions for extended periods of time.

2. Description of Related Art

Removable reflective marking tape is widely used for temporarily delineating alternative traffic lanes on roadway surfaces and for providing added visibility to traffic channelizers during periods of construction. While it is important that the marking tape be durable and effective during its period of use, it must also be easily removable when the reason for its application ends. In other words, the marking tape must be able to be removed without tearing or separating and without leaving adhesive residue on the road. Such is generally the regulatory requirement for each state's highway department.

Various so-called removable reflective marking tapes with multi-layer structures are known in the art, as typified by Jones et al. U.S. Pat. No. 4,299,874. The '874 patent discloses a marking tape having a top polymeric layer with retroreflective microspheres protruding from the layer, a backing layer of a pliant material such as a polymer-based sheet or a metal foil, and an adhesive layer with an embedded stretchable porous fibrous web, such as Reemay® Spunbonded Polyester supplied by DuPont. The purpose of the fibrous web is as a reinforcement layer to the backing layer to attempt to yield a larger proportion of adhesive from the roadway upon removal of the tape.

Other materials have been tested by the inventors and found to also be inadequate as reinforcement layers as such materials do not hold the tape together when removed from the road surface. One such material is Claf™ nonwoven fabric, which is a cross-laminated fibrillated film of high density polyethelene or polypropylene supplied by CON-WED of St. Paul, Minn. Another material is a 6×32 mesh with a thickness of 0.015±0.005 inches and a weight of 1.2 ounces per square yard ±15% supplied by Apex Mills Corporation of Inwood, N.Y. In this case, the mesh size as well as the diameter of the thread is too large, therefore requiring too much adhesive to cover the entire mesh, thus allowing the extra adhesive to be left behind on the road surface.

With the above considerations in mind, it is an object of the present invention to provide a reflective marking tape that will meet the requirements of various highway departments for durability and removability.

It is another object of the present invention to provide a removable pavement marking tape having a construction which will allow the tape to be easily removable from the pavement of the roadway and yet remain durable during its period of use.

SUMMARY OF THE INVENTION

The present invention is a new and improved removable reflective marking tape that has a multi-layer structure. In a preferred embodiment, the marking tape includes:

(1) a top coating layer having a mixture of variably indexed embedded glass spheres on its upper face, (2) a backing layer consisting of 0.0025 to 0.0035 inches (2.5 to 3.5 mil) thick aluminum which allows the tape to conform to uneven roadway surfaces;

(3) a reinforcement layer adhered to the aluminum layer consisting of a polyester 17×13 (count per square inch) mesh netting that provides multidirectional strength for reducing the tearing of the tape upon removal; and, (4) A pressure sensitive hot melt adhesive disposed below the netting to bind the tape to the road surface.

The top coating layer may include a release agent such as silicone, with a laminating adhesive between the various composite layers.

According to another embodiment of the present invention, a layer of high density polyethelene is laminated between the aluminum backing layer and the mesh reinforcement layer.

According to a further embodiment of the present invention, the backing layer is a highly plasticized flexible static cling vinyl film.

BRIEF DESCRIPTION OF THE DRAWINGS

The above-mentioned and other features, advantages and objects of this invention, in the manner in which they are obtained, will become more apparent and will be best understood by reference to the detailed description in conjunction with the accompanying drawings which follow, wherein.

DESCRIPTION OF THE PREFERRED EMBODIMENTS

Figure 1:
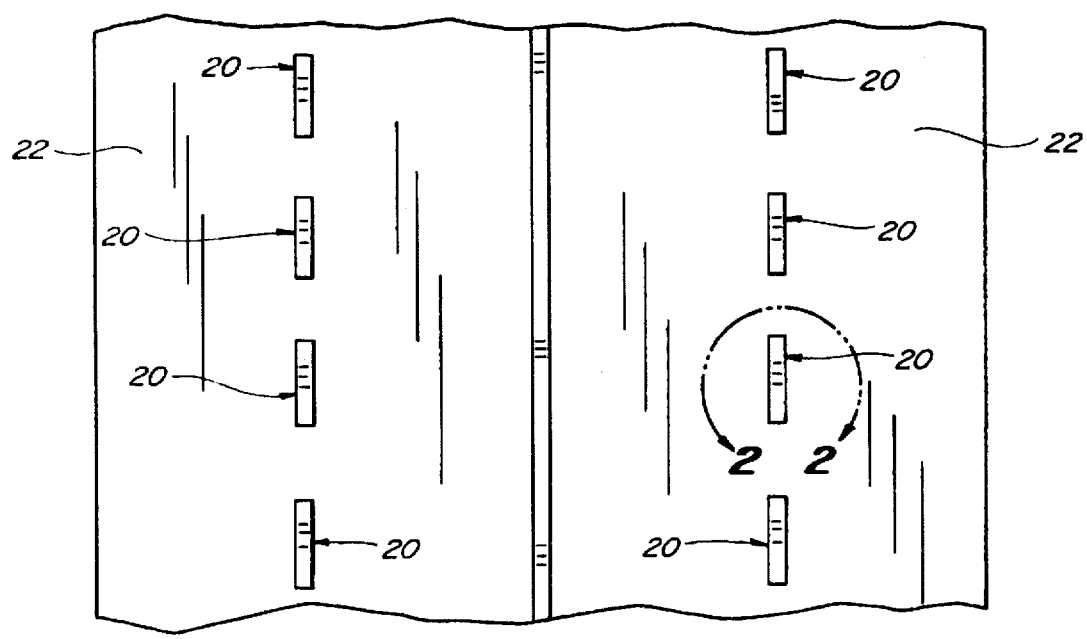
FIG. 1 is a fragmentary perspective view of an embodiment of the marking tape according to the present invention, bound to a roadway.
Figure 2:
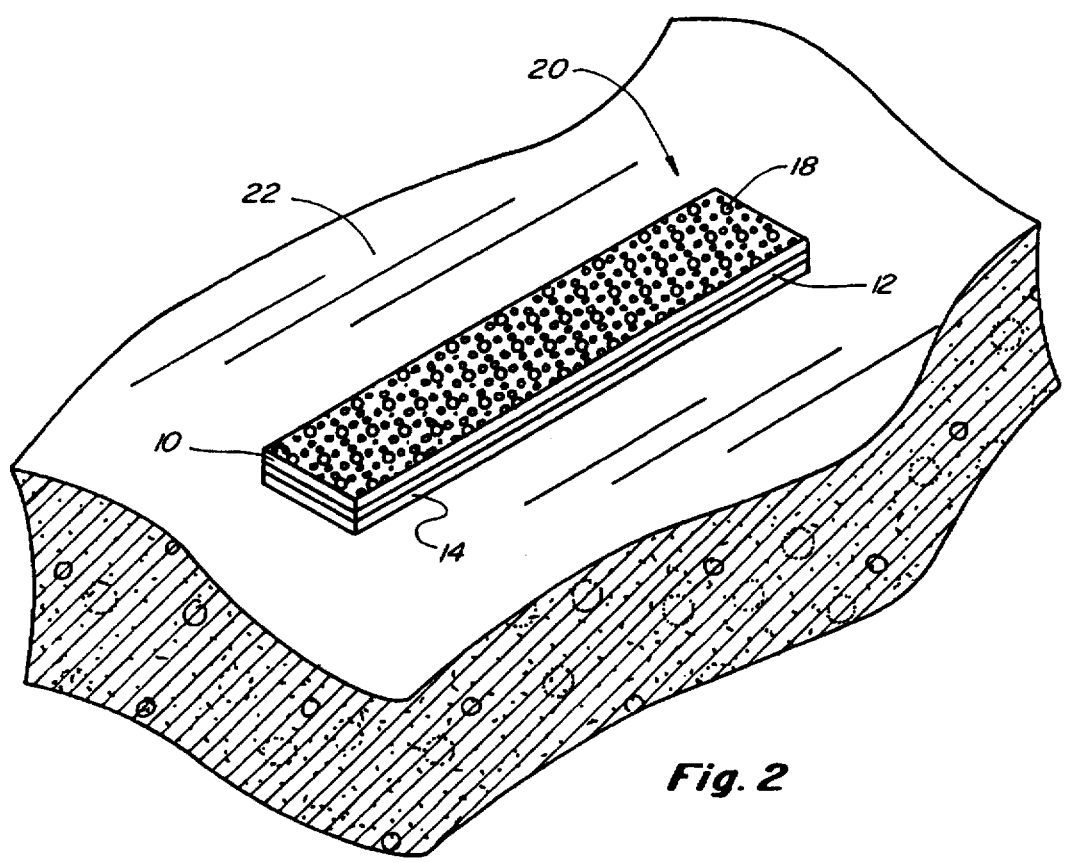
FIG. 2 is an enlarged view of the tape of FIG. 1 taken about circle 2—2.

Referring to FIG. 1, a marking tape 20 is shown bound to a roadway 22. Additionally, it should be appreciated that the tape 20 can be affixed to traffic channelizers or other structures for providing added visibility to help prevent automobile operators from crossing traffic lanes into construction hazards. One feature of the tape 20 is that it can endure variable and extreme weather conditions for extended periods of time without peeling from the roadway or structure. Another feature is that the tape 20 can be applied in 50 degrees Fahrenheit or greater weather without adverse effects on durability or reliability.

Figure 3:
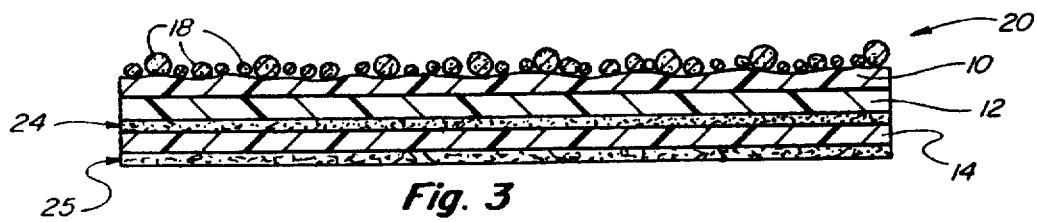
FIG. 3 is an enlarged side view of the marking tape of FIGS. 1 and 2.

As best illustrated in FIG. 3, the marking tape 20 has a multi-layer structure, generally comprising a top coating layer 10, an intermediate backing layer 12, and a reinforcement layer 14.

Figure 4:
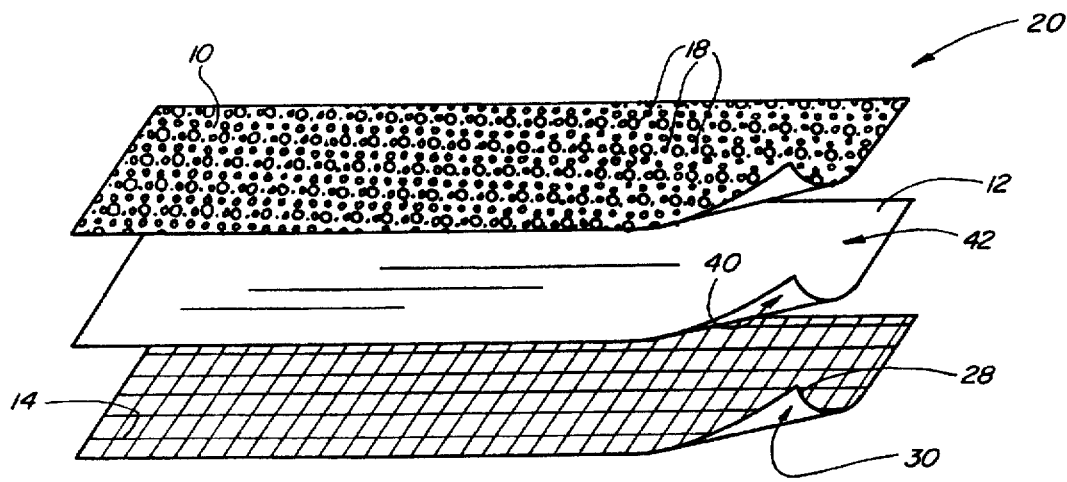
FIG. 4 is an enlarged exploded view of a portion of the marking tape of FIGS. 1 and 2.

With additional reference to FIG. 4, the top coating layer 10 is a pigmented vinyl paint having reflective elements 18 embedded therein. The reflective elements 18 preferably include a mixture of 30/50 (U.S. mesh) high index reflective glass beads and either 60/80 (U.S. mesh) low index reflective glass beads or other skid resistant materials. A silicone or similar release agent (not shown) is applied to the upper surface of the top coating layer 10 for adhesive blocking purposes. This top coating layer 10 imparts both anti-skid characteristics and suitable nighttime visibility, i.e. high reflectivity, which is maintained throughout the use of the tape, despite progressive wear by traffic and the elements.

The top coating layer 10 is applied onto the upper side 42 of the intermediate backing layer 12 which increases the conformability of the tape 20 to uneven roadway surfaces. In the preferred embodiment of the present invention, the backing layer 12 is a film of aluminum 0.0025 to 0.0035 inches (2.5 to 3.5 mil) thick.

In an alternate embodiment of the invention, the backing layer 12 is a film of 0.008 to 0.012 inches (8 to 12 mil) thick Plasticling Static Cling Vinyl, supplied by Plastiprint, Inc. of Cincinnati, Ohio. The vinyl film has a surface tension of 32–36 dynes/cm, a tolerance of ±10% on thickness, and dimensional stability of –3% (50 C.×10 minutes). Other types of vinyl films or plastic films may be suitable and used. When the vinyl film is used for the backing layer 12, the reflective elements 18 instead includes a mixture of 30/50 high index (1.9 index of refraction) beads and 60/80 low index (1.5 index of refraction) beads. The reason for using different beads is to offer improved reflective characteristics and abrasion resistance.

Because the marking tape 20 is employed in situations where the lane change is only temporary or the traffic channelizers are to be recycled or retaped, the marking tape 20 must be easily removable. For this purpose, the reinforcement layer 14 is used. The reinforcement layer 14 is a polyester mesh netting which provides multidirectional tear strength, tensile strength and elongation characteristics which allows the marking tape 20 to be removed in at least approximately three foot strips as opposed to bits and pieces. The mesh netting is fabricated from a Polyester 150 Denier fiber with a 17×13 (count per square inch) mesh count and a thickness of 0.0175 inches (17.5 mil), supplied by Jason Mills, Inc. of Westwood, N.J. The mesh is heat set at 375 degrees Fahrenheit, has a Raschel (3 bar) knit, an acrylic finish, and a weight of 3.84 (±0.05) ounces per square yard. While other meshes may be used, the aforementioned mesh has been found superior in performance.

The entire tape is manufactured by a multi-pass lamination process. The top coating layer 10 is applied in a wet state to the upper side 42 of the backing layer 12 that consists of a pigmented vinyl paint and glass beads. The paint solvents are drawn off during a curing process, thus adhering the coating layer together to the backing layer. Afterwards, the release agent is applied to the top of coating layer 10.

The mesh reinforcement layer 14 is then attached by means of a multi-pass lamination process. In the first pass, the upper side 28 of the mesh reinforcement layer 14 is bound to the aluminum intermediate layer 12 by means of Midwest 21-3-1™ EVA Foam Adhesive. In the following passes, the adhesive fills in the mesh "holes." The result of the lamination process is an adhesive layer 24, best discerned in FIG. 3.

The lower side 30 of the mesh reinforcement layer 14 has an adhesive layer 26 applied thereto which releasably attaches the marking tape 20 to the surface of the roadway 22. The adhesive layer 26 is a pressure-sensitive hot melt.

Figure 5:
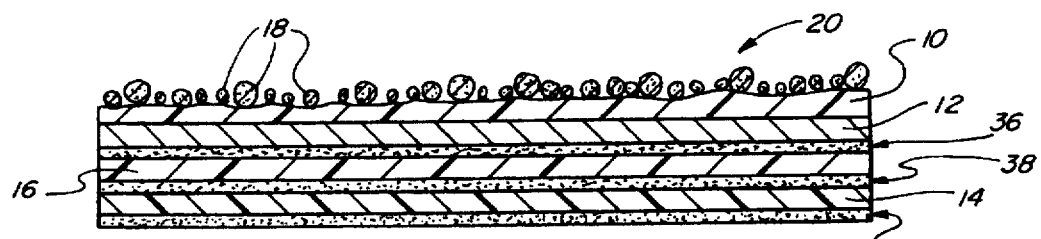
FIG. 5 is a side view of another embodiment of the marking tape of the present invention.
Figure 6:
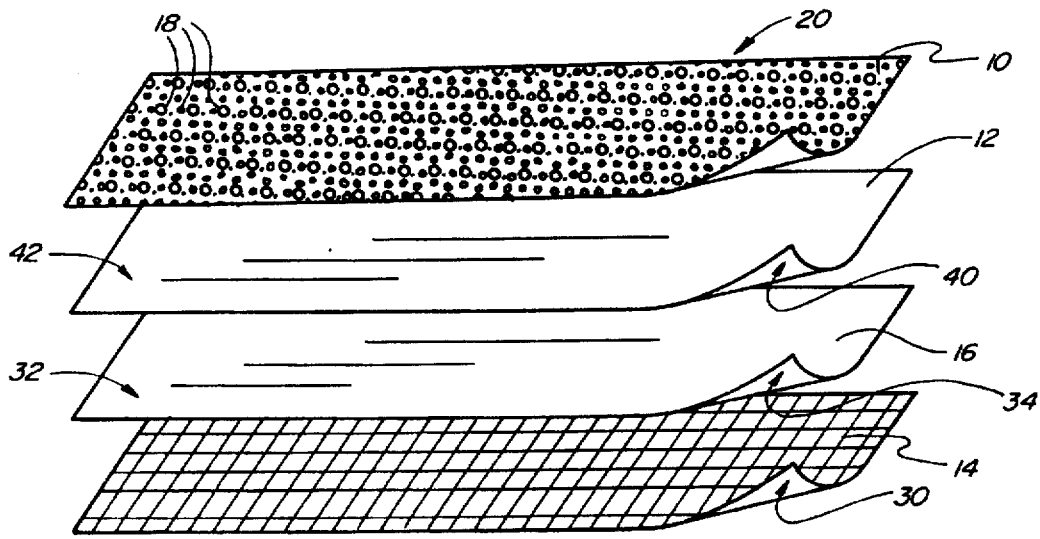
FIG. 6 is an enlarged exploded view of a portion of the marking tape of FIG. 5.

In another embodiment of the invention, as shown in FIGS. 5 and 6, a layer 16 of high density polyethelene is laminated on its upper side 32 to the backing layer 12, formed of the 0.0025 to 0.0035 inches (2.5 to 3.5 mil) thick aluminum film, and laminated on its lower side 34 again by a multi-pass process to the mesh reinforcement layer 14, thereby forming adhesive layers 36 and 38, respectively. The adhesive used for both laminations is Midwest 21-3-1™ EVA Foam Adhesive. When the layer 16 of high density polyethelene is used, the reflective elements are a mixture of 30/50 high index (1.9 index of refraction) beads and either 60/80 low index (1.5 index of refraction) beads or other skid resistant material. The reason for using this combination is to offer improved reflective characteristics, abrasion resistance, and skid resistance. The utilization of the high density polyethelene layer 36 is to provide additional fracture and tear resistance which allows the composite tape to be cleanly removed after use.

Accordingly, while this invention is described with reference to preferred embodiments of the invention, it is not intended to be construed in a limiting sense. It is rather intended to cover any variations, uses or adaptions in the invention utilizing its general principles. Various modifications will be apparent to persons skilled in the art upon reference to this description. It is therefore contemplated that the appended claims will cover any such modifications or embodiments as fall within the true scope of the invention.

What is claimed is:

1. A removable laminated pavement marking tape for temporary marking of roadway surfaces, comprising:

a) a top reflective paint layer;

b) a backing layer providing a base for said paint layer;

c) a mesh reinforcement layer in the form of an open polyester netting having a 17×13 count per square inch mesh, a thickness of 17.5 mil, and a weight of 3.79 to 3.89 ounces per square yard, said mesh reinforcement layer being laminated to said backing layer by a first adhesive layer, said reinforcement layer providing strength to said backing layer and said backing layer and said mesh reinforcement layers providing strength to prevent separation of the layers of the marking tape and providing breaking resistance to overcome adhesion of the marking tape to a surface on which it is applied and to permit said marking tape to be cleanly removed from said surface; and d) a second adhesive layer disposed below said polyester netting, said second adhesive layer providing means for bonding said marking tape to said surface.

2. The marking tape of claim 1, wherein said top reflective paint layer is a vinyl pigmented paint having a plurality of glass beads incorporated therein.

3. The marking tape of claim 1, wherein said backing layer is a 2.5 to 3.5 mil thick aluminum film.

4. The marking tape of claim 1, wherein said backing layer is a 8 to 12 mil thick vinyl film.

5. The marking tape of claim 3, further comprising a high density polyethylene layer laminated between said intermediate backing layer and said mesh reinforcement layer.

6. The marking tape of claim 1, wherein said second adhesive layer is a pressure-sensitive hot melt.

7. The marking tape of claim 3, wherein said top reflective paint layer is a vinyl pigmented paint having a plurality of glass beads incorporated therein.

8. The marking tape of claim 7, wherein said plurality of glass beads includes a mixture of 30/50 (U.S. mesh) high index beads and either 60/80 (U.S. mesh) low index beads or a skid resistant material.

9. The marking tape of claim 4, wherein said top reflective paint layer is a vinyl pigmented paint having a plurality of glass beads incorporated therein.

10. The marking tape of claim 2, wherein said plurality of glass beads includes a mixture of 30/50 (U.S. mesh) high index beads and 60/80 (U.S. mesh) low index beads.

11. The marking tape of claim 5, wherein said top reflective paint layer is a vinyl pigmented paint having a plurality of glass beads incorporated therein.

12. The marking tape of claim 11, wherein said plurality of glass beads includes a mixture of 30/50 (U.S. mesh) high index beads and either 60/80 (U.S. mesh) low index beads or a skid resistant material.

13. The marking tape of claim 1, further including a silicone release agent applied to the upper surface of said top reflective paint layer.

14. The marking tape of claim 10, wherein said top reflective paint layer further includes a skid resistant material.

* * * * *